(12) United States Patent
Philipps-Liebich et al.

(10) Patent No.: US 6,347,784 B1
(45) Date of Patent: Feb. 19, 2002

(54) LIMITED-ROTATION VALVE-CONTROL KNOB WITH OVERRIDE

(75) Inventors: Hartwig Philipps-Liebich, Hemer; Norbert Heupel, Meschede, both of (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 09/584,822

(22) Filed: May 31, 2000

(30) Foreign Application Priority Data

Jun. 12, 1999 (DE) .......................... 199 26 867

(51) Int. Cl.[7] .......................... F16K 35/00; F16K 51/00
(52) U.S. Cl. .......................... 251/92; 251/93; 251/107; 251/109; 251/96; 251/99; 251/284; 251/288
(58) Field of Search .......................... 251/92, 93, 101, 251/107, 108, 109, 96, 98, 99, 284–286, 288

(56) References Cited

U.S. PATENT DOCUMENTS

| | | | | |
|---|---|---|---|---|
| 759,341 | A | * | 5/1904 | Brown |
| 1,596,913 | A | * | 8/1926 | Wilson |
| 1,844,551 | A | * | 2/1932 | Anderson |
| 4,848,333 | A | * | 7/1989 | Waite .................... 128/205.11 |
| 5,183,073 | A | * | 2/1993 | Roberts .................... 137/385 |
| 5,230,465 | A | | 7/1993 | Kostroz |

FOREIGN PATENT DOCUMENTS

EP 0 232 454 8/1987

* cited by examiner

*Primary Examiner*—Kevin Shaver
*Assistant Examiner*—David A Bonderer
(74) *Attorney, Agent, or Firm*—Herbert Dubno; Andrew Wilford

(57) ABSTRACT

A valve having a housing from which projects a stem rotatable about an axis has an actuating assembly with an abutment ring fixed on the housing, formed with an annular slot, and having an abutment projecting radially into the slot. A knob mounted on and rotatable with the stem adjacent the ring carries a single-arm abutment lever pivoted on the knob and having an end engaged in the slot and displaceable radially between a radial outer position angularly engageable with the abutment and a radial inner position so that when the end is in the outer position rotation of the knob is blocked by engagement of the lever end and the abutment. A spring braced between the knob and lever urges the end into the outer position. A radially displaceable button on the knob engageable with the lever is radially inwardly displaceable to move the lever into its inner position. The abutment lever is a third-class lever with the fulcrum at one end, the load formed by the end that contacts the ring abutment at the opposite end, and the force applied by the button in the middle.

12 Claims, 8 Drawing Sheets

LIMITED-ROTATION VALVE-CONTROL KNOB WITH OVERRIDE

FIELD OF THE INVENTION

The present invention relates to a valve. More particularly this invention concerns an actuating assembly or control knob for a valve whose rotation is normally limited but where the rotation limit can be overridden.

BACKGROUND OF THE INVENTION

A standard valve-actuating assembly is described in European 0,232,454. The valve has a housing from which projects a stem rotatable about an axis. The actuating assembly comprises an abutment ring fixed on the housing, formed with an annular slot, and having an abutment projecting radially outward into the slot. A knob mounted on and rotatable with the stem adjacent the ring carries another abutment which normally rides in the slot and which can be deflected outward to clear the abutment in the slot. When the knob abutment is not moved, the two abutments limit the angular travel of the knob and therefore the temperature or volume of water outputted by the valve. The abutment is formed as a first-class or two-arm lever which requires that the entire knob assembly be axially rather long, something that is often quite undesirable from a design point of view.

OBJECTS OF THE INVENTION

It is therefore an object of the present invention to provide an improved valve-actuating assembly.

Another object is the provision of such an improved valve-actuating assembly which overcomes the above-given disadvantages, that is which is extremely simple and compact, yet inexpensive and simple to manufacture.

SUMMARY OF THE INVENTION

A valve having a housing from which projects a stem rotatable about an axis has an actuating assembly with according to the invention an abutment ring fixed on the housing, formed with an annular slot, and having an abutment projecting radially into the slot. A knob mounted on and rotatable with the stem adjacent the ring carries a single-arm abutment lever pivoted on the knob and having an end engaged in the slot and displaceable radially between a radial outer position angularly engageable with the abutment and a radial inner position so that when the end is in the outer position rotation of the knob is blocked by engagement of the lever end and the abutment. A spring braced between the knob and lever urges the end into the outer position. A radially displaceable button on the knob engageable with the lever is radially inwardly displaceable to move the lever into its inner position.

With this system the abutment lever is a third-class lever with the fulcrum at one end, the load formed by the end that contacts the ring abutment at the opposite end, and the force applied by the button in the middle. Accordingly the structure can be made quite compact and short to allow the assembly to be incorporated in an attractive valve.

The abutment lever according to the invention can be unitarily formed with the button. It can be formed with a radially inwardly open blind bore holding a compression spring seated in the bore and radially inwardly engaging the knob.

In another system the lever arm has another end seated in the knob and is elastically deformable so that the lever arm forms the spring. Such a structure is extremely simple, durable, and inexpensive to manufacture.

The knob in accordance with the invention is formed with a diametral cutout and is provided in the diametral cutout with a crosspiece having an end forming an opening through which the button projects. The abutment lever is mounted on the crosspiece. In this system the abutment lever can be unitarily formed with the button or the lever arm can have another end seated in the crosspiece and be elastically deformable so that the lever arm forms the spring as described above.

Normally according to the invention the button has a body formed with tangentially extending pivot pins seated in the crosspiece. The body has formations such as barbed gripper noses engaging and fitting with the lever arm. In addition the crosspiece is formed with axially open snap seats in which the pivot pins are engaged. In this system the spring can have a coil body with one leg bearing against the crosspiece and another leg bearing against the abutment. The abutment has an outer face bearing on the knob in the outer position. The crosspiece has elastically deformable mounting tongues engaging the knob and securing the crosspiece thereon and the stem engages the tongues and locks them to the knob when the knob is mounted on the stem.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
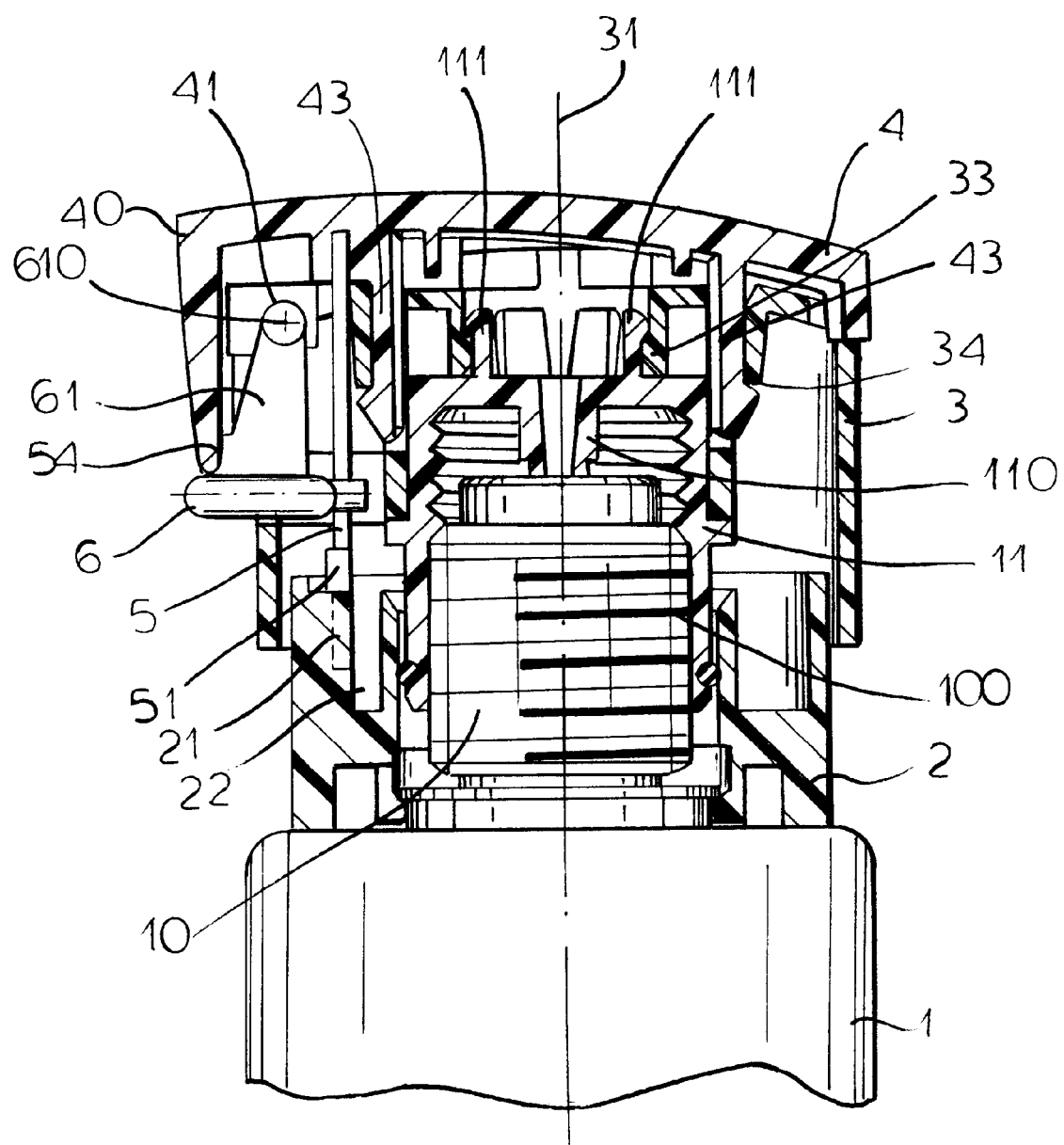
FIG. 1 is an axial vertical section through a valve according to the invention.
Figure 2:
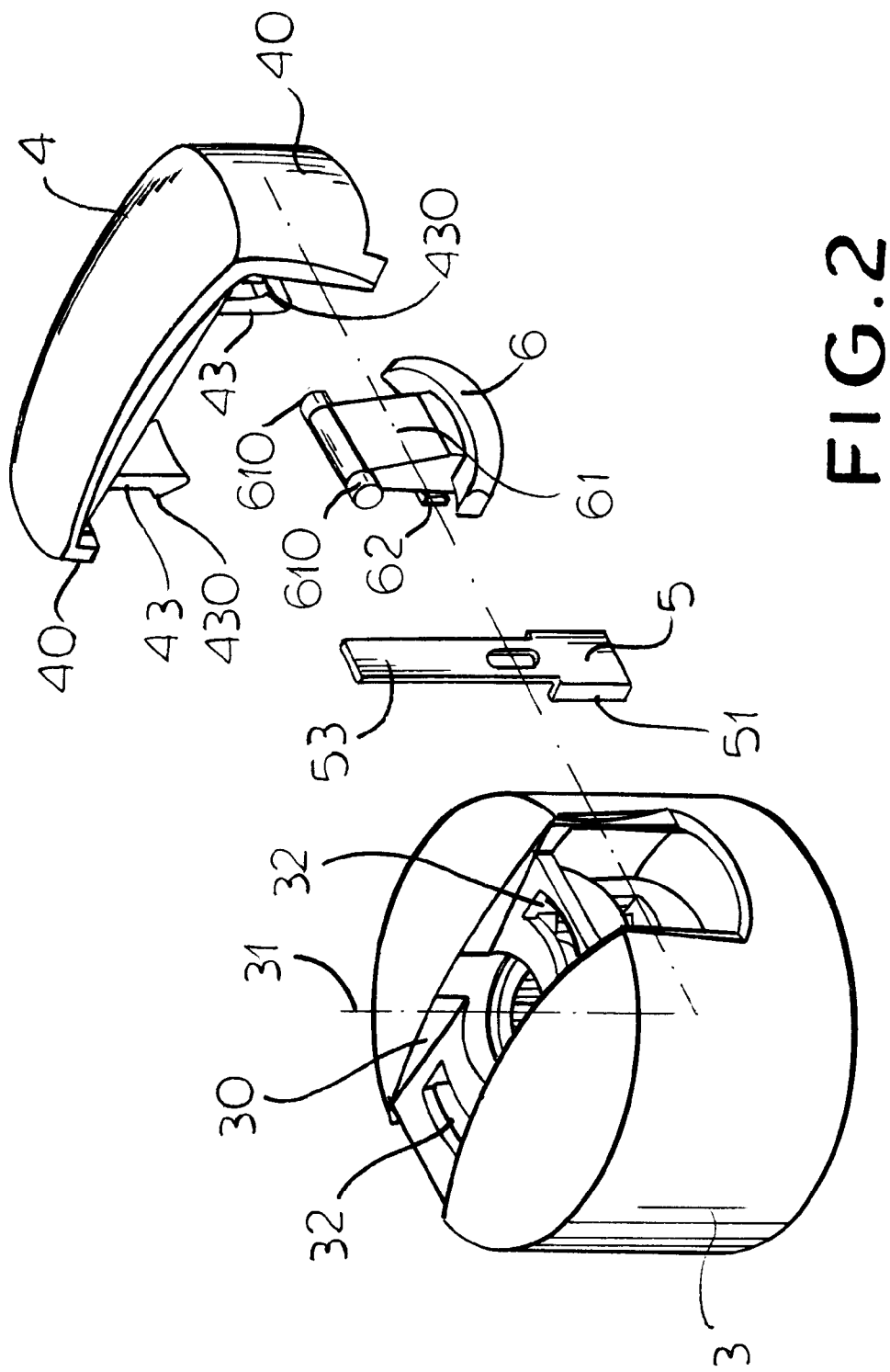
FIG. 2 is an exploded view of the knob of FIG. 1.
Figure 3:
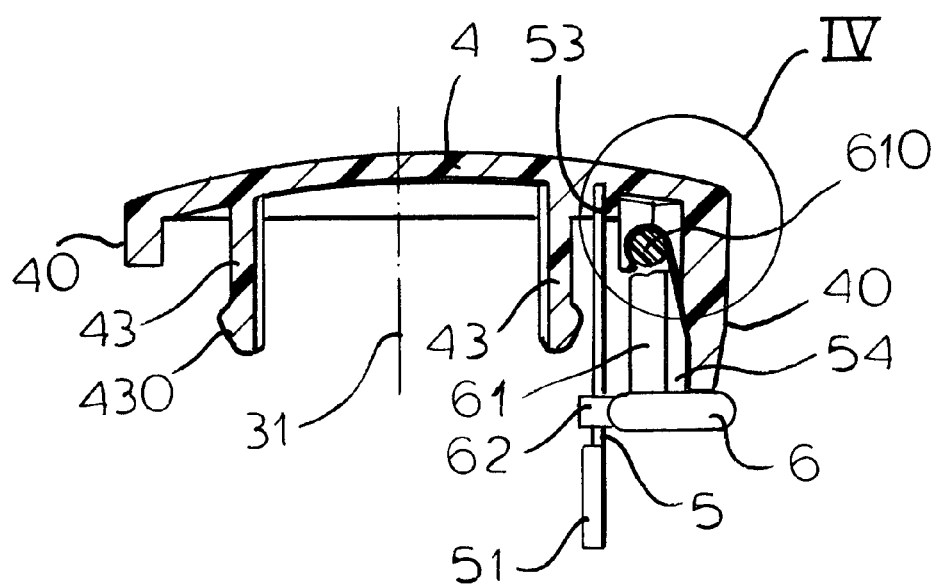
FIG. 3 is a section through a crosspiece of the knob of FIG. 2.

As seen in FIGS. 1 to 4, a valve 1 has a fixed collar 2 surrounding a stem screw 10 extending along an axis 31 and formed with a screwthread 100 on which is threaded a cap-like stem nut 11 having a central axially projecting pin 110 engaging an unillustrated thermostatic control element. As the stem nut 11 is screwed up and down on the stem screw 10, it varies the temperature of water outputted by the valve as described, for instance, in U.S. Pat. No. 5,230,465. Axially extending splines on the exterior of the nut 11 mesh with complementary internal splines of a knob 3 and axially outwardly extending and elastically deformable barb fingers 111 formed on the nut 11 snap behind a collar 33 of this knob 3 to secure these parts 11 and 3 axially together.

The knob 3 is formed with a diametral groove or cutout 30 receiving a crosspiece 4 having elastically deformable axially inwardly directed fingers 43 extending through slots 32 in the knob 3 and having enlarged ends 430 engaged underneath a shoulder 34 of the knob 4 to secure these parts 3 and 4 axially together. When thus fitted together the fingers 43 are pressed outward by the nut 11 to lock the assembly solidly together so that normally the crosspiece 4 is mounted to the knob 3 before the knob 3 is mounted on the stem nut 11. Ends 40 of the crosspiece 4 substantially close the exterior of the slot 30 of the knob 3.

Figure 4:
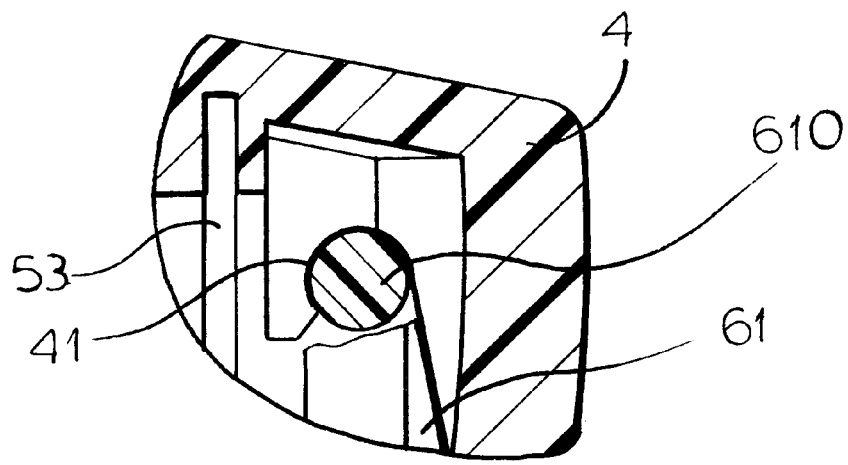
FIG. 4 is a large-scale view of the detail indicated at IV in FIG. 3.

One of the ends 40 is longer than the other and exposes a button 6 bearing on an abutment 5 formed of spring steel and having an upper end 53 seated in the knob 4 as shown in FIG. 4. This abutment 5 has a lower end 51 that can travel angularly of the axis 31 in an annular slot 22 of the fixed ring 2 on rotation of the knob 3. This ring 2 is formed in turn with a radially inwardly projecting sawtooth-shaped abutment bump 21 having a flank extending radially of the axis 31 and an opposite flank extending more tangentially or secantally of the axis 31. Thus in the illustrated normal position of FIG. 1 the bump 21 will impede rotation of the knob 4 past a certain position which is typically set to correspond to a water output temperature of 37° C.

The abutment end 51 can be moved radially inward to pass the bump 21 by the button 6 which is mounted at the lower end of an axially extending arm or body 61 whose upper end is formed with tangentially extending pivot pins 610 fitted in pivot seats 41 formed in the knob 4. These seats 41 are axially open but somewhat more than semicylindrical so the pins 610 can be snapped into them but will rotate freely when thus mounted. The lower end of the body 61 is formed on its inner face with a pair of snap noses 62 that engage around and hold the abutment 5 just above its lower end 51 that is of U-section so as to be strong and relatively unbendable. The radially outwardly directed outer face 54 of the lower end of the body 61 has a curvature corresponding to the interior of the knob 4 so it seats solidly thereagainst.

Thus with this system if the button 6 is not pressed inward the knob 4 will only be able to rotate about the axis 31 to vary the water temperature up to 37° C. which is basically body temperature. If hotter water is wanted, the user must depress the button 6 to displace the abutment end 51 inward so it can move angularly past the right-angle flank of the sawtooth bump 21. On return movement the end 51 will ride up on the angled flank of the bump 21 and drop down on its other side, so that the button does not need to be depressed to return to a temperature below 37° C.

Figure 5:
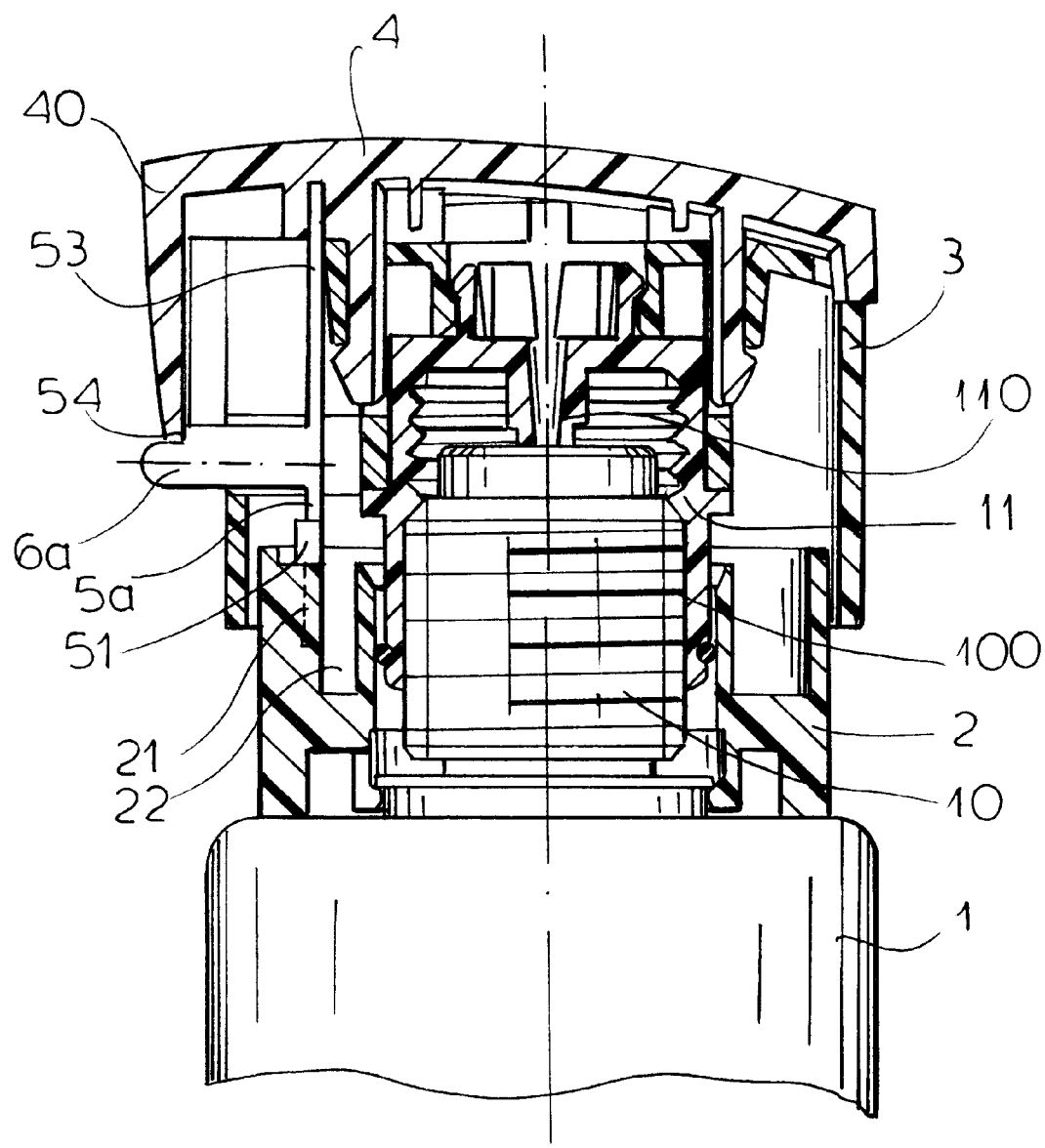
FIGS. 5 and 6 are views like FIG. 1 through further valves according to the invention.
Figure 6:
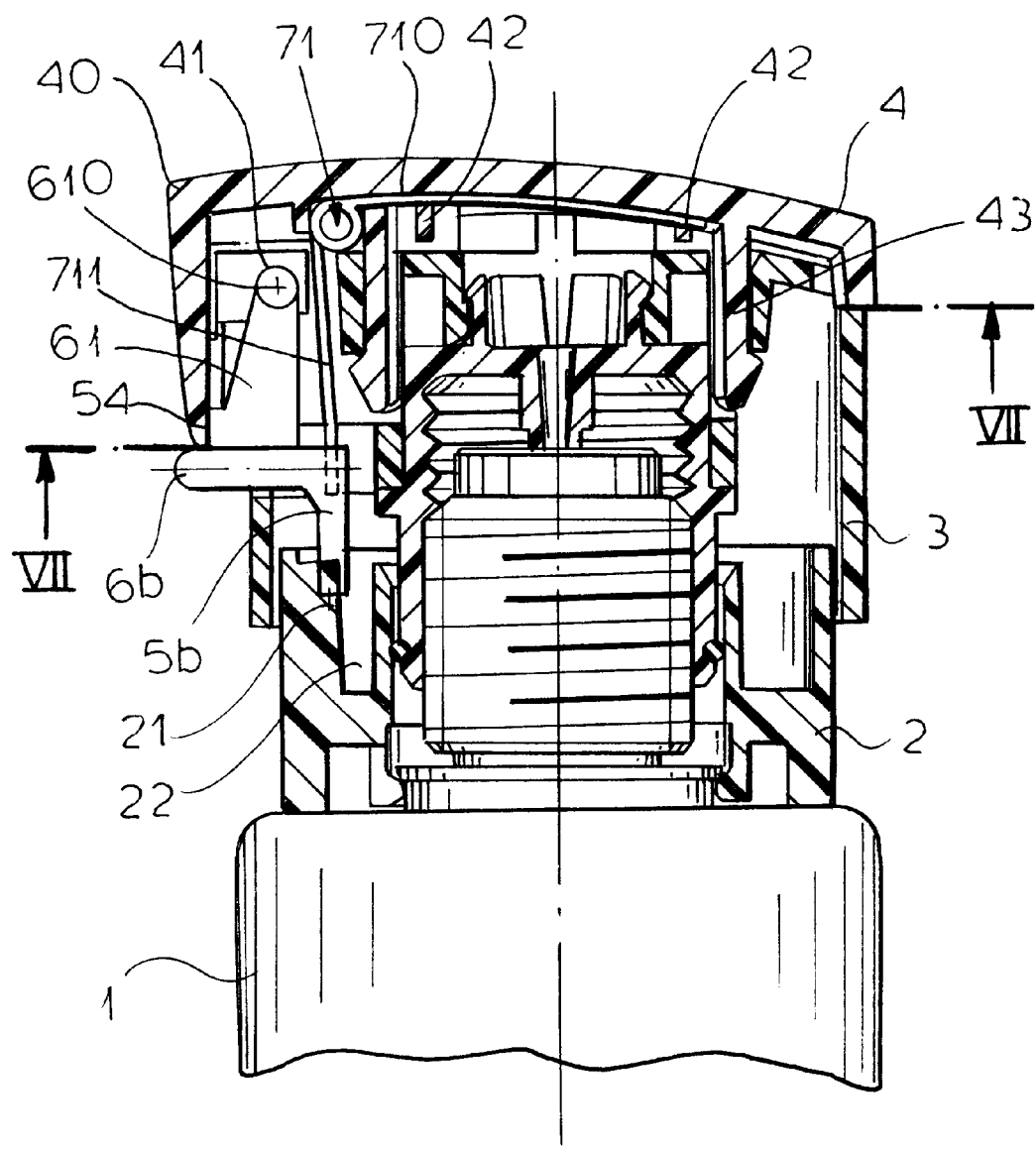
Figure 8:
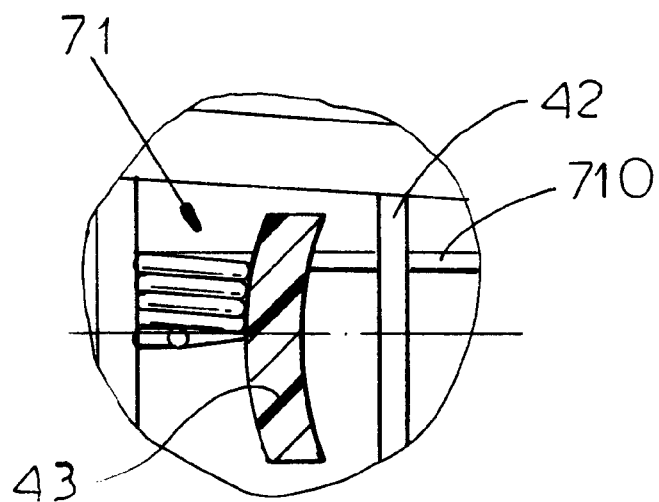
FIG. 8 is a large-scale view of the detail indicated at VIII of FIG. 7.
Figure 7:
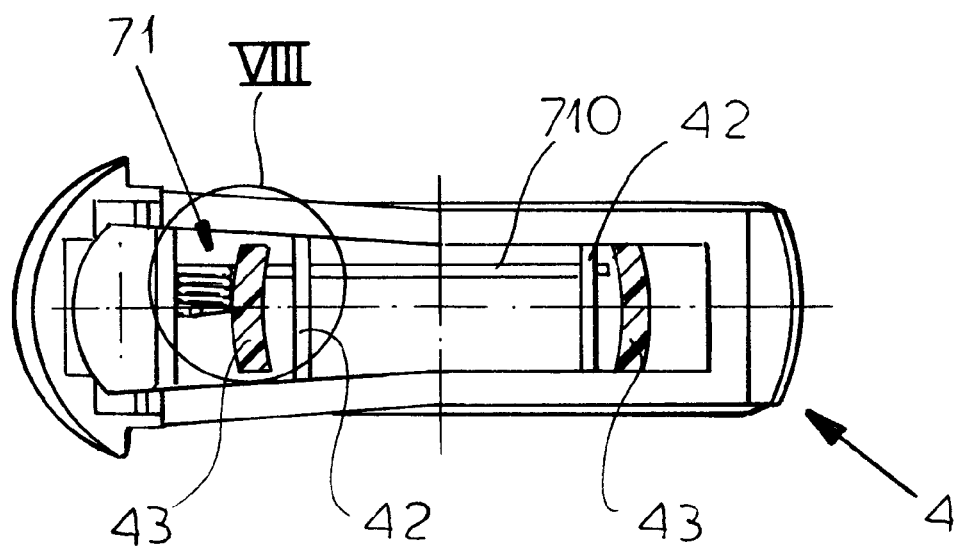
FIG. 7 is a section taken along line VII—VII of FIG. 6 through a crosspiece of the FIG. 6 valve.

In the system of FIG. 5 the button 6a is formed integrally with the abutment 5a. Otherwise this arrangement is identical to that of FIGS. 1 to 4 In FIGS. 6 to 8 the plastic button 6b is formed with a downwardly extending arm 5b constituting the abutment. A torque spring 71 has an arm 710 held by webs 42 against the underside of the crosspiece 4 and another arm 711 bearing against the button 6b and abutment 5b to urge them radially outward so that the bump 21 is in the path of the abutment 5b.

Figure 9:
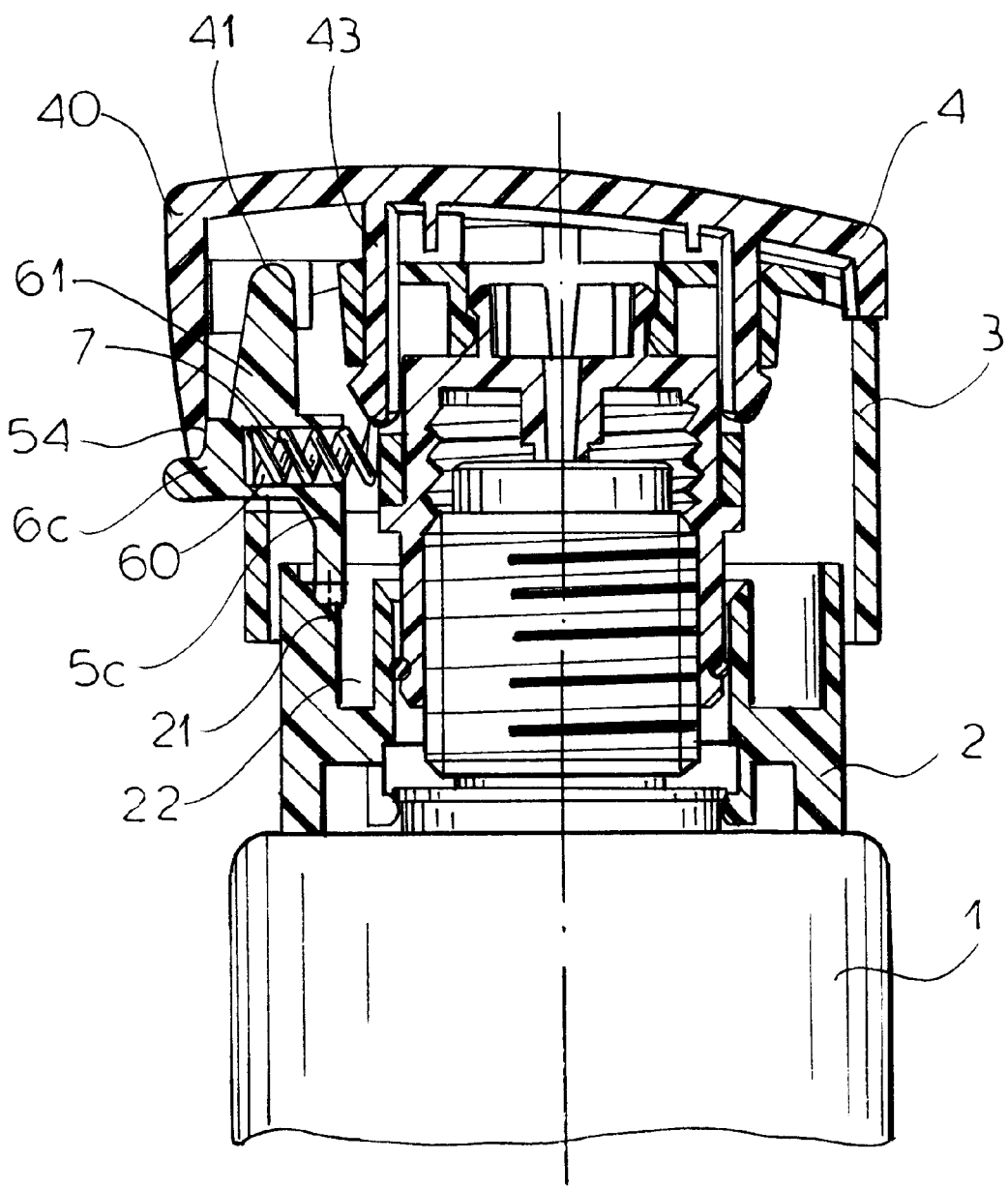
FIGS. 9 and 10 are views like FIG. 1 through further valves in accordance with the invention.

The system of FIG. 9 has an abutment 5c formed integrally with the plastic button 6c and formed with a radially inwardly open cylindrical blind bore 54 holding a coil spring 7 bearing radially inward on the knob 3. Thus this spring 7 urges the abutment 5c radially outward.

Figure 10:
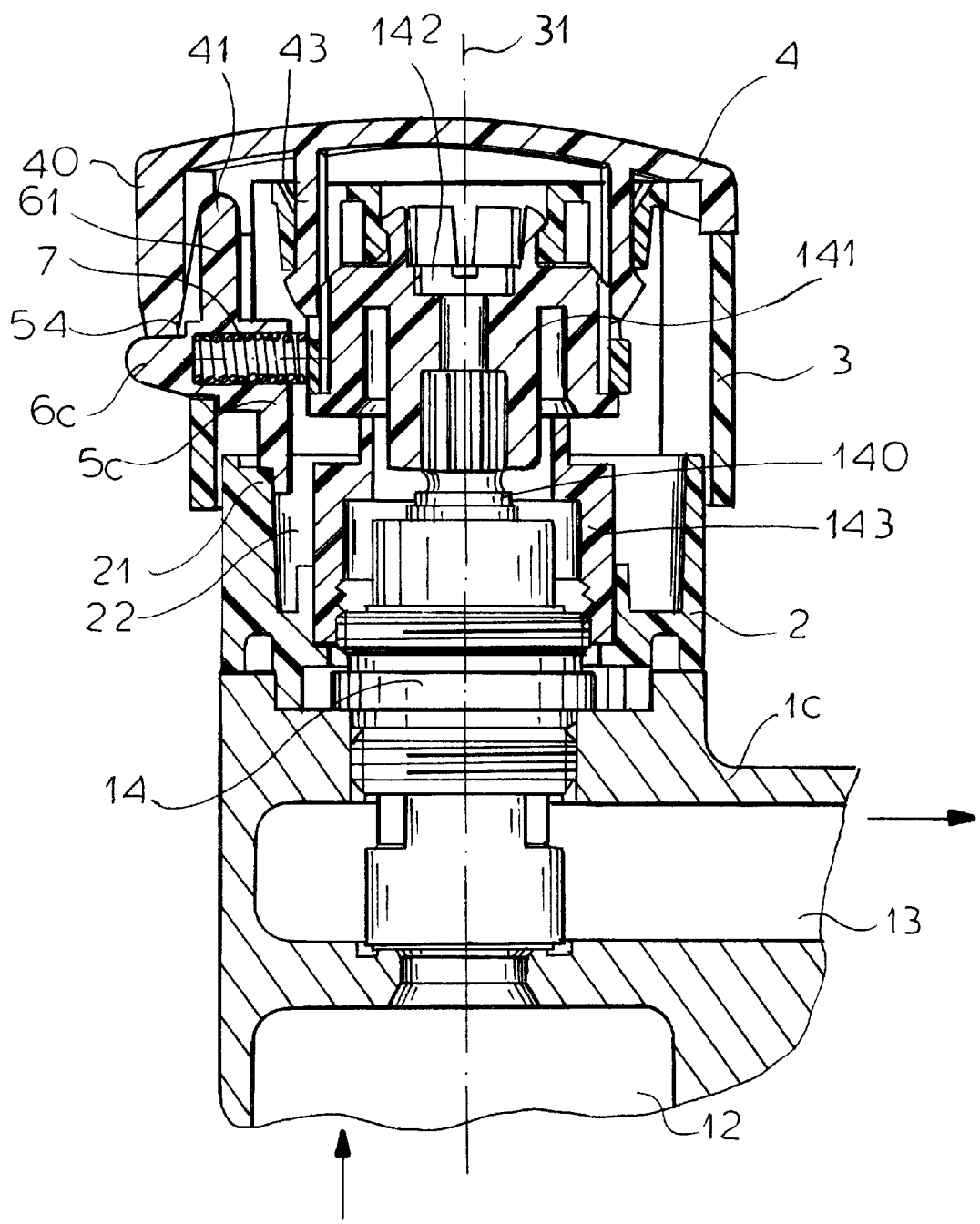

FIG. 10 has an abutment 5c and button 6c identical to that of FIG. 9, but here the valve 1c is a flow-control valve with an input port 12, an output port 13, and a valve body 14 rotatable about the axis 31 between them. A plastic fitting 141 atop a stem 140 of the body is secured by a screw 142 to the knob 3 The abutment ring 2 is secured in place by a threaded sleeve or nut 143 fixed to the valve 1c. In this arrangement the abutment 5c engages the abutment bump 21 when the valve 1c is about half open. To get more flow it is necessary to depress the button 6c so the abutment 5c clears the bump 21.

We claim:

1. In combination with a valve having a housing from which projects a stem rotatable about an axis, an actuating assembly comprising:

an abutment ring fixed on the housing, formed with an annular slot, and having an abutment projecting radially into the slot;

a knob mounted on and rotatable with the stem adjacent the ring and formed with a diametral cutout;

a crosspiece in the diametral cutout having an end forming an opening;

a single-arm abutment lever pivoted on the crosspiece and having an end engaged in the slot and displaceable radially between a radial outer position angularly engageable with the abutment and a radial inner position, whereby when the end is in the outer position rotation of the knob is blocked by engagement of the lever end and the abutment;

a spring braced between the knob and lever and urging the end into the outer position; and a radially displaceable button on the knob, projecting through the opening, engageable with the lever, and radially inwardly displaceable to move the lever into its inner position.

2. The valve-actuating assembly defined in claim 1 wherein the abutment lever is unitarily formed with the button.

3. The valve-actuating assembly defined in claim 2 wherein the abutment lever is formed with a radially inwardly open blind bore and the spring is a compression spring seated in the bore and radially inwardly engaging the knob.

4. The valve-actuating assembly defined in claim 1 wherein the lever arm has another end seated in the knob and is elastically deformable.

5. The valve-actuating assembly defined in claim 1 wherein the abutment lever is unitarily formed with the button.

6. The valve-actuating assembly defined in claim 1 wherein the lever arm has another end seated in the crosspiece and is elastically deformable.

7. The valve-actuating assembly defined in claim 6 wherein the button has a body formed with tangentially extending pivot pins seated in the crosspiece, the body having formations engaging and fitting with the lever arm.

8. The valve-actuating assembly defined in claim 7 wherein the crosspiece is formed with axially open snap seats in which the divot pins are engaged.

9. The valve-actuating assembly defined in claim 1 wherein the spring has a coil body with one leg bearing against the crosspiece and another leg bearing against the abutment.

10. The valve-actuating assembly defined in claim 1 wherein the abutment has an outer face bearing on the knob in the outer position.

11. The valve-actuating assembly defined in claim 1 wherein the crosspiece has elastically deformable mounting tongues engaging the knob and securing the crosspiece thereon.

12. The valve-actuating assembly defined in claim 11 wherein the stem engages the tongues and locks them to the knob when the knob is mounted on the stem.

* * * * *